US006170965B1

(12) United States Patent
Kotovsky

(10) Patent No.: US 6,170,965 B1
(45) Date of Patent: Jan. 9, 2001

(54) METHOD AND APPARATUS FOR LOCKING A YOKE OR GIMBAL RING ASSEMBLY

(76) Inventor: Irwin Kotovsky, 3941 California Ave., Pittsburgh, PA (US) 15212

( * ) Notice: Under 35 U.S.C. 154(b), the term of this patent shall be extended for 0 days.

(21) Appl. No.: 09/161,252

(22) Filed: Sep. 26, 1998

(51) Int. Cl.[7] .............................................. B60Q 1/06

(52) U.S. Cl. ........................ 362/371; 362/147; 362/404; 362/418; 362/426; 362/427

(58) Field of Search ............................ 362/364, 365, 362/368, 147, 404, 418, 419, 427, 428, 426, 371

(56) References Cited

U.S. PATENT DOCUMENTS 4,316,237 * 2/1982 Yamada et al. ........................ 362/33
4,337,506 * 6/1982 Terada .................................. 362/142

* cited by examiner

*Primary Examiner*—Stephen Husar
*Assistant Examiner*—John Anthony Ward
(74) *Attorney, Agent, or Firm*—Ansel M. Schwartz

(57) ABSTRACT

A lighting apparatus. The lighting apparatus includes a mounting structure. The apparatus includes a gimbal ring assembly for holding a lamp. The gimbal ring assembly has a first axis and a second axis perpendicular with the first axis. The gimbal ring assembly is rotatable about the first axis and about the second axis. The gimbal ring assembly is connected to the mounting structure. The apparatus includes a locking mechanism for locking the gimbal ring assembly in a fixed position relative to the first axis, to the second axis and the mounting structure. A lighting apparatus. The lighting apparatus includes a yoke. The apparatus includes a lamp ring for holding a lamp. The lamp ring is connected to the mounting structure. The apparatus includes a ring locking mechanism for locking the lamp ring in a fixed position relative to the yoke. A method for lighting. The method includes the steps of attaching a mounting structure to a ceiling. Then there is the step of orienting an outer ring of a gimbal ring assembly at a first position relative to a second axis of the gimbal ring assembly. Next there is the step of locking the outer ring in place relative to the mounting structure. Then there is the step of orienting an inner ring having a lamp of the gimbal ring assembly at a second position relative to a first axis of the gimbal ring assembly. Next there is the step of locking the inner ring assembly to the outer ring assembly.

15 Claims, 3 Drawing Sheets

FIG.1
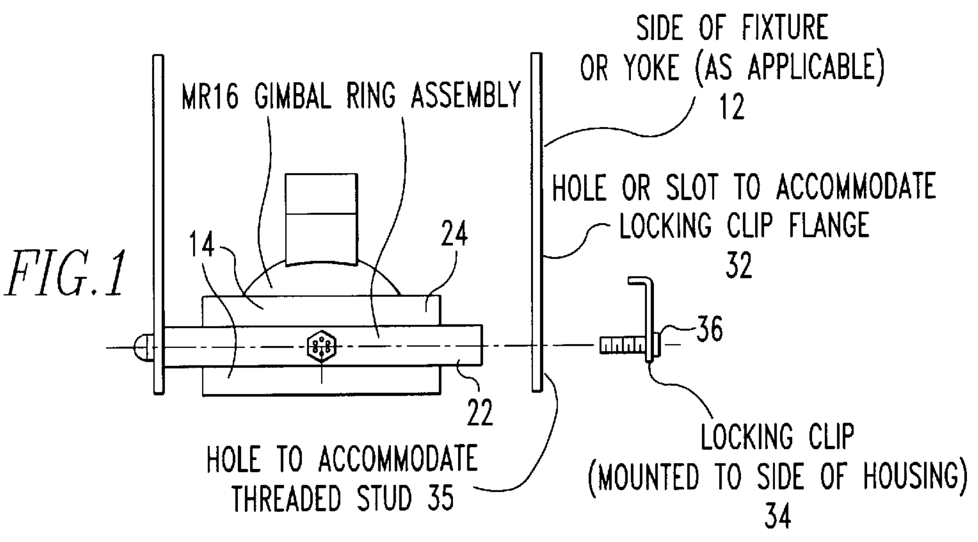
FIG.2
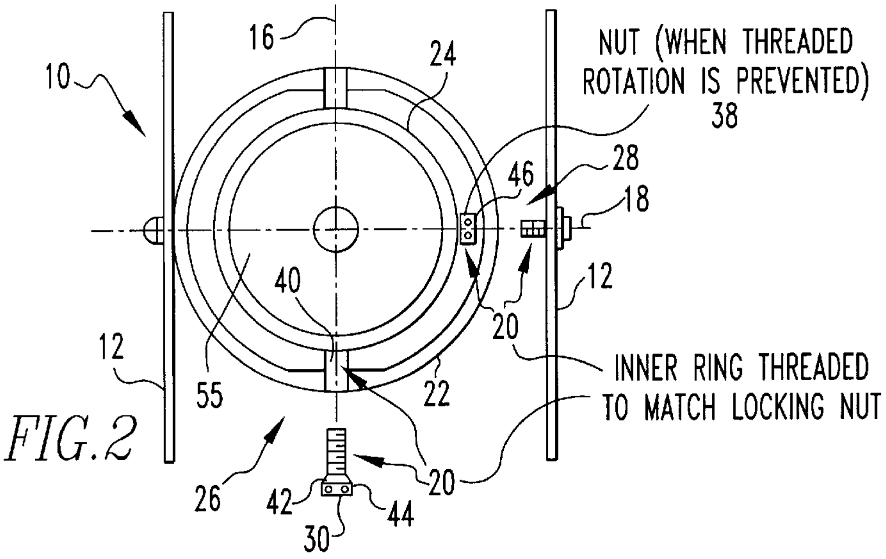
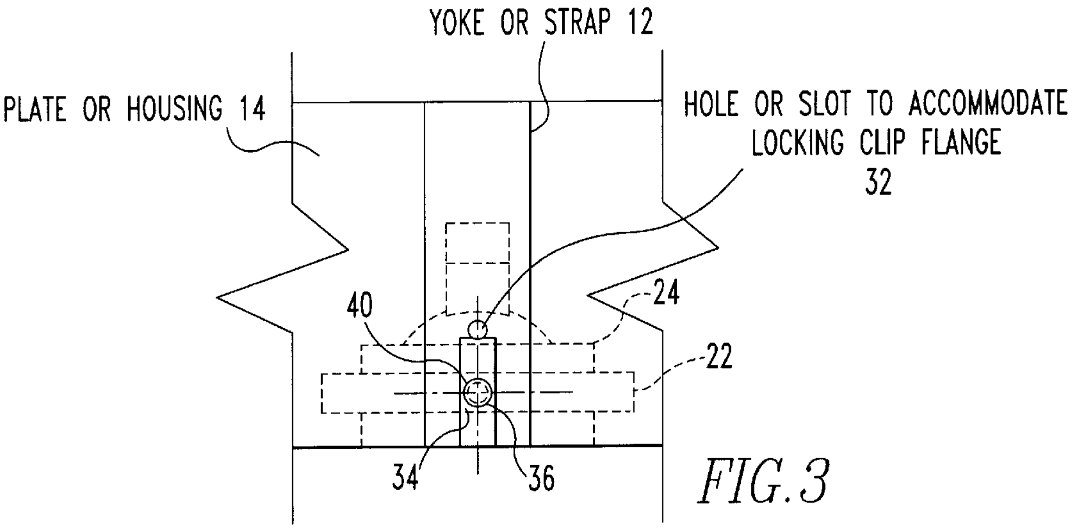
FIG.3

METHOD AND APPARATUS FOR LOCKING A YOKE OR GIMBAL RING ASSEMBLY

FIELD OF THE INVENTION

The present invention is related to a lighting apparatus having a gimbal assembly with at least one ring to hold a lamp. More specifically, the present invention is related to a lighting apparatus having a gimbal assembly with at least one ring having a lamp where the ring can be locked into place.

BACKGROUND OF THE INVENTION

In many situations, lighting is used not only to illuminate an area to bring attention to an area, but to create a lighting effect on an area. To do this, the lamp is carefully chosen to focus on a specific area. This means that when a gimbal assembly is used, the ring or rings must be carefully positioned to achieve the aforementioned results. The gimbal assembly is then left alone until the lamp held by the gimbal assembly simply needs to be changed. When this happens, the ring or rings are jarred and moved from their previously set position. After the lamp is replaced, the ring or rings must be reset. In many instances, where the lamp is in the ceiling, this is not always simple. Also, the persons responsible for changing the lamp may not be qualified to properly refocus the lamp and gimbal assembly. The present invention avoids having to reset the gimbal assembly after the lamp is changed.

SUMMARY OF THE INVENTION

The present invention pertains to a lighting apparatus. The lighting apparatus comprises a mounting structure. The apparatus comprises a gimbal ring assembly for holding a lamp. The gimbal ring assembly has a first axis and a second axis perpendicular with the first axis. The gimbal ring assembly is rotatable about the first axis and about the second axis. The gimbal ring assembly is connected to the mounting structure. The apparatus comprises a locking mechanism for locking the gimbal ring assembly in a fixed position relative to the first axis, to the second axis and the mounting structure.

The present invention pertains to a lighting apparatus. The lighting apparatus comprises a yoke. The apparatus comprises a lamp ring for holding a lamp. The lamp ring is connected to the mounting structure. The apparatus comprises a ring locking mechanism for locking the lamp ring in a fixed position relative to the yoke.

The present invention pertains to a method for lighting. The method comprises the steps of attaching a mounting structure to a ceiling. Then there is the step of orienting an outer ring of a gimbal ring assembly at a first position relative to a second axis of the gimbal ring assembly. Next there is the step of locking the outer ring in place relative to the mounting structure. Then there is the step of orienting an inner ring having a lamp of the gimbal ring assembly at a second position relative to a first axis of the gimbal ring assembly. Next there is the step of locking the inner ring assembly to the outer ring assembly.

BRIEF DESCRIPTION OF THE DRAWINGS

In the accompanying drawings, the preferred embodiment of the invention and preferred methods of practicing the invention are illustrated in which:

FIG. 1 is an end view of a lighting apparatus of the present invention.

FIG. 2 is a bottom view of a lighting apparatus of the present invention.

FIG. 3 is a side view of a lighting apparatus of the present invention.

DETAILED DESCRIPTION

Figure 4:
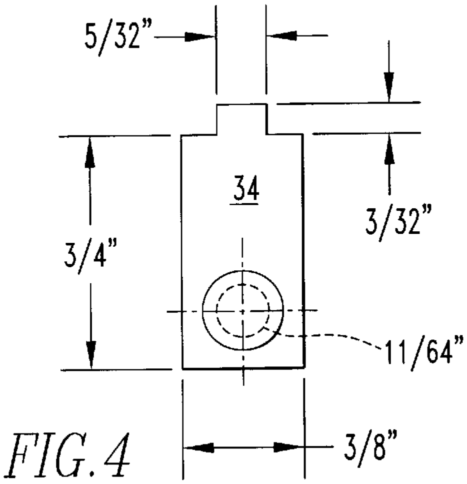
FIG. 4 is a front view of a locking clip with threaded stud or screw.

Referring now to the drawings wherein like reference numerals refer to similar or identical parts throughout the several views, and more specifically to FIGS. 1, 2 and 3 thereof, there is shown a lighting apparatus 10. The lighting apparatus 10 comprises a mounting structure 12. The apparatus comprises a gimbal ring assembly 14 for holding a lamp 55. The gimbal ring assembly 14 has a first axis 16 and a second axis 18 perpendicular with the first axis 16. The gimbal ring assembly 14 is rotatable about the first axis 16 and about the second axis 18. The gimbal ring assembly 14 is connected to the mounting structure 12. The apparatus comprises a locking mechanism 20 for locking the gimbal ring assembly 14 in a fixed position relative to the first axis 16, to the second axis 18 and the mounting structure 12.

Preferably, the gimbal ring assembly 14 comprises an outer ring 22 and an inner ring 24. The outer ring 22 is disposed about the inner ring 24.

Figure 9:
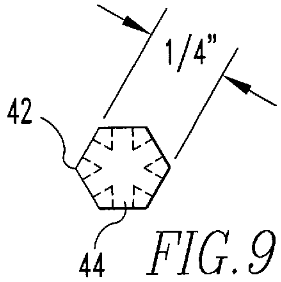
FIG. 9 is a top view of a locking threaded screw or stud.
Figure 8:
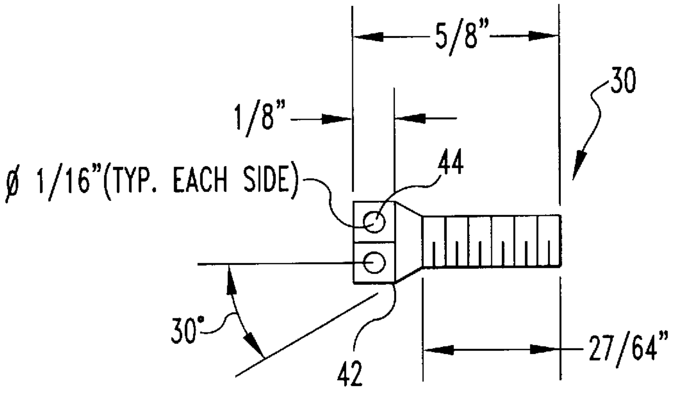
FIG. 8 is a side view of a locking threaded screw or stud.
Figure 10:
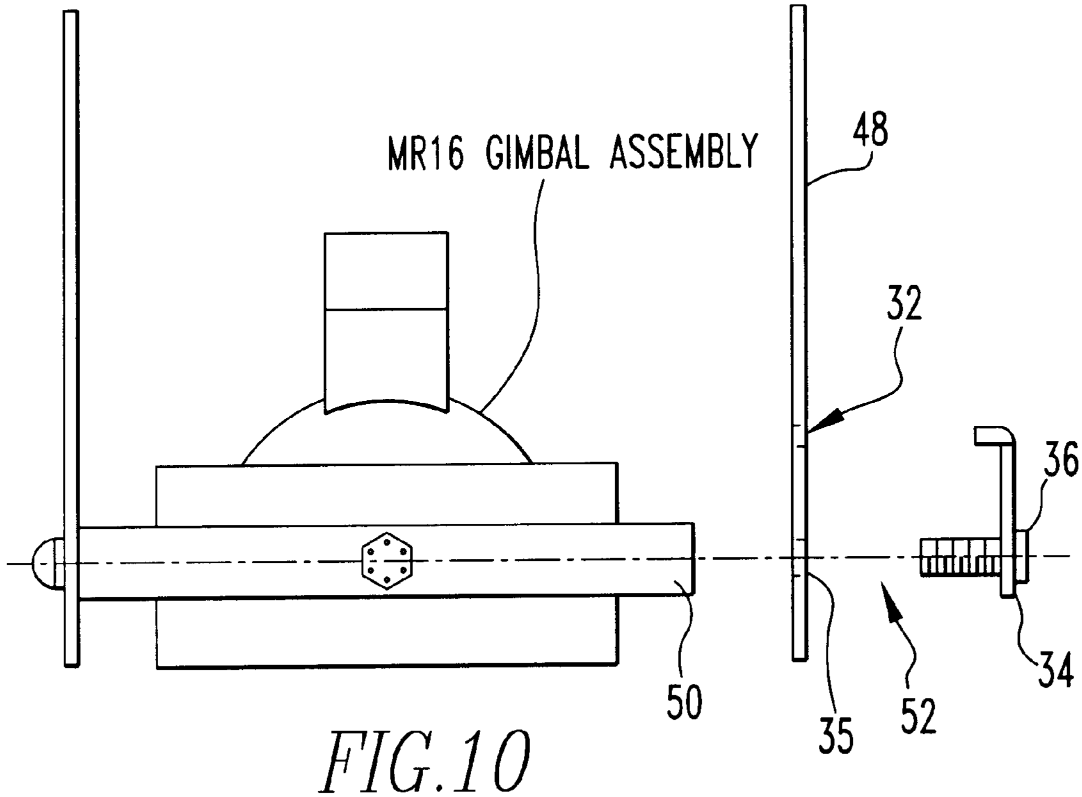
FIG. 10 is an end view of an alternative embodiment of a lighting apparatus of the present invention.

The locking mechanism 20 preferably includes a first lock mechanism 26 which locks the inner ring 24 to the outer ring 22 relative to the first axis 16. The first lock mechanism 26 preferably includes a first locking threaded screw or stud 30, as shown in FIGS. 8 and 9, that contacts the outer ring 22 and the inner ring 24.

Figure 6:
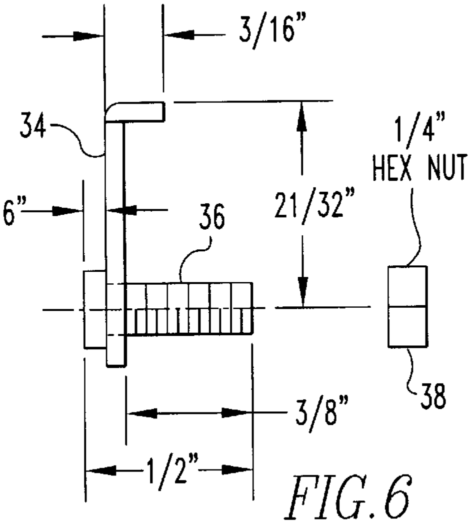
FIG. 6 is a side view of a locking clip with threaded stud or screw.
Figure 5:
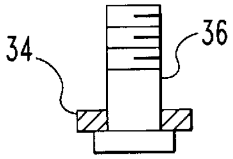
FIG. 5 is a top view of a locking clip with threaded stud or screw.

Preferably, the locking mechanism 20 includes a second lock mechanism 28 which locks the outer ring 22 to the mounting structure 12 relative to the second axis 18. Preferably, the mounting structure 12 includes a slot 32 and the second lock mechanism 28 includes a locking clip 34, as shown in FIGS. 4–6, which engages the mounting structure 12 through the hole or slot 32. Preferably, the second lock mechanism 28 includes a second threaded screw or stud 36 that extends through the mounting structure 12 via the locking clip 34 and contacts the outer ring 22.

Figure 7:
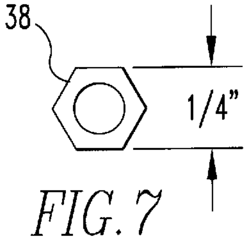
FIG. 7 is a top view of an inner nut.
Figure 7A:
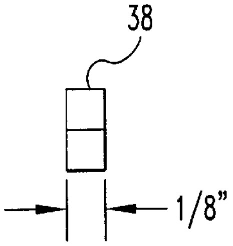

The second lock mechanism 28 preferably includes an inner nut 38, as shown in FIGS. 6 and 7, disposed between the inner ring 24 and upper ring. The second threaded screw or stud 36 extends through the outer ring 22 and contacts the inner nut 38 which holds the second threaded screw or stud 36 in place so the outer ring 22 cannot rotate about the second axis 18. Preferably, the inner nut 38 has an inner head 46 with holes 44 which are adapted to receive a tool to tighten or loosen the second threaded screw or stud 36 from the nut 38.

Preferably, the inner ring 24 has a threaded hole 40 which receives the first locking threaded screw or stud 30 so the first locking threaded screw or stud 30 holds the inner ring 24 and outer ring 22 together and prevents their moving relative to each other about the first axis 16. The first locking threaded screw or stud 30 preferably has a locking head 42 with holes 44 which are adapted to receive a tool to tighten or loosen the first locking threaded screw or stud 30.

The present invention pertains to a lighting apparatus 10. The lighting apparatus 10 comprises a yoke 48. The apparatus comprises a lamp ring 50 for holding a lamp 55. The lamp ring 50 is connected to the mounting structure 12. The apparatus comprises a ring locking mechanism 52 for locking the lamp ring 50 in a fixed position relative to the yoke 48.

Preferably, the yoke 48 includes a hole or slot 32 and the ring locking mechanism 52 includes a locking clip 34 which engages the yoke 48 through the slot 32. Preferably, the ring locking mechanism 52 includes a second threaded screw or stud 36 that extends through the yoke 48 via the locking clip 34 and contacts the outer ring 22. The ring locking mechanism 52 preferably includes an inner nut 38 disposed in the lamp ring 50. The second threaded screw or stud 36 extends through the lamp ring 50 and contacts the inner nut 38 which holds the second threaded screw or stud 36 in place so the lamp ring 50 cannot rotate relative to the yoke 48.

The present invention pertains to a method for lighting. The method comprises the steps of attaching a mounting structure 12 to a ceiling. Then there is the step of orienting an outer ring 22 of a gimbal ring assembly 14 at a first position relative to a second axis 18 of the gimbal ring assembly 14. Next there is the step of locking the outer ring 22 in place relative to the mounting structure 12. Then there is the step of orienting an inner ring 24 having a lamp 55 of the gimbal ring assembly 14 at a second position relative to a first axis 16 of the gimbal ring assembly 14. Next there is the step of locking the inner ring 24 assembly to the outer ring 22 assembly.

Preferably, after the locking the inner ring 24 step, there is the step of changing the lamp 55 of the inner ring 24 without the position of the inner ring 24 or outer ring 22 changing.

In the operation of the preferred embodiment, a lighting apparatus 10 is placed in a ceiling. This placement occurs by fixing the mounting structure 12 to the ceiling as is well known in the art. In the mounting structure 12 is a gimbal ring assembly 14. The gimbal ring assembly 14 is comprised of an outer ring 22 and an inner ring 24. The gimbal ring assembly can be a standard MR16 gimbal ring assembly available from Modular International, Inc. of Pittsburgh, Pa. The inner ring 24 holds a lamp. The inner ring 24 is rotatably connected to the outer ring 22 and the inner ring 24 is able to rotate about a first axis 16 of the gimbal ring assembly 14. The outer ring 22 is rotatably attached to the mounting structure 12, as is well known in the art, so that the outer ring 22 can rotate about a second axis 18.

A first locking threaded screw or stud 30 is screwed through a hole in the outer ring 22 and further threaded into a threaded hole 40 in the inner ring 24. When the first locking threaded screw or stud 30 is tightened, it screws through the hole in the outer ring 22 and screws in to the threaded hole 40 in the inner ring 24 where it fixes the outer ring 22 with the inner ring 24 so the inner ring 24 cannot move or rotate. After the outer ring 22 is placed in a desired position relative to the second axis, the first locking threaded screw or stud 30 is tightened to fix the inner ring 24 in place so the lamp remains focused and fixed in place in a desired direction.

The outer ring 22 is fixed in place after it is rotated to a desired position relative to the second axis 18 by a locking clip 34 first being mounted to the side of the mounting structure 12 through a hole or slot 32 in the mounting structure 12. A second threaded screw or stud 36 extends through the locking clip 34 and through a locking clip hole 35 so it extends into the interior of the mounting structure 12.

The second threaded screw or stud 36 is screwed through a hole in the outer ring 22 that is aligned with the locking clip hole 35 until it threads into an inner nut 38. The inner nut 38 is disposed between the inner ring 24 and the outer ring 22. When the second threaded screw or stud 36 is tightened into the inner nut 38, the outer ring 22 becomes held by the threaded stud in place relative to the mounting structure 12 and the second axis 18.

The locking nut 38 can have a locking head 42 with holes 44 which receive a tool, such as an Allen wrench, to facilitate tightening or loosening of the second threaded screw or stud 36. Similarly, the inner nut 38 can have an inner head 46 with holes 44 for the same purpose to facilitate tightening or loosening.

The advantage of the present invention is that it allows the inner ring 24 and outer ring 22 to be fixed in place once the lamp is in the desired position. Whenever the lamp burns out or needs to be changed for whatever reason, whether it be a day, a week, a month or a year later, the lamp can be changed without any concern of disturbing the position the lamp is held in by the gimbal ring assembly. This is because the inner ring 24 and outer ring 22 have become fixed in place through the use of the second threaded screw or stud 36, locking clip 34, inner nut 38, first locking threaded screw or stud 30 and threaded hole 40.

In a similar manner, a yoke 48 which only has a lamp ring 50 can have a locking clip 34 attached to the yoke 48. The second threaded screw or stud 36 can then be used with an inner nut 38 to hold the lamp ring 50 in place, for the same reason, as described above.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A lighting apparatus comprising:

a mounting structure;

a gimbal ring assembly for holding a lamp, said gimbal ring assembly having a first axis and a second axis perpendicular with the first axis, said gimbal ring assembly rotatable about the first axis and about the second axis, said gimbal ring assembly connected to the mounting structure; and a locking mechanism for locking the gimbal ring assembly in a fixed position relative to the first axis, to the second axis and the mounting structure.

2. An apparatus as described in claim 1 wherein the gimbal ring assembly comprises an outer ring and an inner ring, said outer ring disposed about said inner ring.

3. An apparatus as described in claim 2 wherein said locking mechanism includes a first lock mechanism which locks the inner ring to the outer ring relative to the first axis.

4. An apparatus as described in claim 3 wherein the locking mechanism includes a second lock mechanism which locks the outer ring to the mounting structure relative to the second axis.

5. An apparatus as described in claim 4 wherein the first lock mechanism includes a first threaded screw or stud that contacts the outer ring and the inner ring.

6. An apparatus as described in claim 5 wherein the mounting structure includes a slot and the second lock mechanism includes a locking clip which engages the mounting structure through the slot, and a second threaded screw or stud that extends through the mounting structure via the locking clip and contacts the outer ring.

7. An apparatus as described in claim 6 wherein the second lock mechanism includes an inner nut disposed between the inner ring and upper ring, said second threaded screw or stud extending through the outer ring and contacting the inner nut which holds the second threaded stud in place so the outer ring cannot rotate about the second axis.

8. An apparatus as described in claim 7 wherein the inner ring has a threaded hole which receives the first threaded screw or stud so the first threaded screw or stud holds the inner ring and outer ring together and prevents their moving relative to each other about the first axis.

9. An apparatus as described in claim 8 wherein the first threaded screw or stud has a locking head with holes which are adapted to receive a tool to tighten or loosen the first threaded screw or stud.

10. An apparatus as described in claim 9 wherein the inner nut has an inner head with holes which are adapted to receive a tool to tighten or loosen the inner nut.

11. A lighting apparatus comprising:

a yoke;

a lamp ring for holding a lamp, said lamp ring connected to the yoke; and a ring locking mechanism for locking the lamp ring in a fixed position relative to the yoke.

12. An apparatus as described in claim 11 wherein the yoke includes a slot and the ring locking mechanism includes a locking clip which engages the yoke through the slot, and a threaded stud that extends through the mounting structure via the locking clip and contacts the outer ring.

13. An apparatus as described in claim 12 wherein the ring locking mechanism includes an inner nut disposed in the lamp ring, said threaded stud extending through the lamp ring and contacting the inner nut which holds the threaded stud in place so the lamp ring cannot rotate relative to the yoke.

14. A method for lighting comprising the steps of:

attaching a mounting structure to a ceiling;

orienting an outer ring of a gimbal ring assembly at a first position relative to a second axis of the gimbal ring assembly;

locking the outer ring in place relative to the mounting structure;

orienting an inner ring having a lamp of the gimbal ring assembly at a second position relative to a first axis of the gimbal ring assembly; and locking the inner ring assembly to the outer ring assembly.

15. A method as described in claim 14 including after the locking the inner ring step, there is the step of changing the lamp of the inner ring without the position of the inner ring or outer ring changing.

* * * * *